(12) United States Patent
Dai et al.

(10) Patent No.: US 12,439,046 B2
(45) Date of Patent: Oct. 7, 2025

(54) VARIABLE-BIT-RATE IMAGE COMPRESSION METHOD AND SYSTEM, APPARATUS, TERMINAL, AND STORAGE MEDIUM

(71) Applicant: SHANGHAI JIAO TONG UNIVERSITY, Shanghai (CN)

(72) Inventors: Wenrui Dai, Shanghai (CN); Shaohui Li, Shanghai (CN); Chenglin Li, Shanghai (CN); Junni Zou, Shanghai (CN); Hongkai Xiong, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 19/218,104

(22) Filed: May 23, 2025

(65) Prior Publication Data

US 2025/0287004 A1   Sep. 11, 2025

Related U.S. Application Data

(63) Continuation of application No. PCT/CN2023/126934, filed on Oct. 26, 2023.

(30) Foreign Application Priority Data

Dec. 12, 2022 (CN) .......................... 202211605816.8

(51) Int. Cl.
*H04N 19/124* (2014.01)
*H04N 19/13* (2014.01)
(Continued)

(52) U.S. Cl.
CPC ........... *H04N 19/124* (2014.11); *H04N 19/13* (2014.11); *H04N 19/147* (2014.11);
(Continued)

(58) Field of Classification Search
CPC .... H04N 19/124; H04N 19/13; H04N 19/147; H04N 19/184; H04N 19/30; H04N 19/42
See application file for complete search history.

(56) References Cited

U.S. PATENT DOCUMENTS

2003/0147466 A1   8/2003   Liang
2017/0142412 A1   5/2017   Fuchs et al.
(Continued)

FOREIGN PATENT DOCUMENTS

CN   114501013 A   5/2022
CN   115988215 A   4/2023

OTHER PUBLICATIONS

Internation Search Report of PCT/CN2023/126934,Mailed Jan. 28, 2024.
(Continued)

*Primary Examiner* — Jae N Noh

(57) ABSTRACT

The present disclosure provides a variable-bit-rate image compression method and system, an apparatus, a terminal, and a storage medium. The variable-bit-rate image compression method includes: obtaining an initial feature map from a to-be-encoded image; quantizing the initial feature map by a dead-zone quantizer; performing entropy encoding on the quantized feature map and hyper-prior information to obtain a compressed bit-stream; performing entropy decoding on the compressed bit-stream, and recovering quantized hyper-prior information and the quantized feature map; performing inverse quantization on the quantized feature map to obtain a reconstructed feature map; obtaining a reconstructed image from the reconstructed feature map; and adjusting quantization and inverse quantization parameters according to a target bit-rate or target distortion. The present disclosure provides a precise bit-rate control solution, makes the bit-rate of the compressed bit-stream better adapt to the
(Continued)

dynamic change of a network bandwidth, and has an extremely high actual application value.

15 Claims, 4 Drawing Sheets

(51) Int. Cl.
　　*H04N 19/147*　　(2014.01)
　　*H04N 19/184*　　(2014.01)
　　*H04N 19/30*　　(2014.01)
　　*H04N 19/42*　　(2014.01)

(52) U.S. Cl.
　　CPC ........... *H04N 19/184* (2014.11); *H04N 19/30* (2014.11); *H04N 19/42* (2014.11)

(56) References Cited

U.S. PATENT DOCUMENTS

| | | | |
|---|---|---|---|
| 2019/0046068 A1* | 2/2019 | Ceccaldi | .............. G06V 10/764 |
| 2019/0287292 A1* | 9/2019 | Ceccaldi | ................ G06N 3/045 |
| 2021/0382653 A1 | 12/2021 | Muthiah | |

OTHER PUBLICATIONS

Zhou Jing; et. al., Variable Rate Image Compression Method with Dead-zone Quantizer, IEEE, Jul. 28, 2020, section 2.3.

* cited by examiner

VARIABLE-BIT-RATE IMAGE COMPRESSION METHOD AND SYSTEM, APPARATUS, TERMINAL, AND STORAGE MEDIUM

CROSS-REFERENCE TO RELATED APPLICATIONS

This application is a continuation of International Patent Application No. PCT/CN2023/126934 with a filing date of Oct. 26, 2023, designating the United States, and further claims priority to Chinese Patent Application No. 202211605816.8 with a filing date of Dec. 12, 2022. The content of the aforementioned applications, including any intervening amendments thereto, is incorporated herein by reference.

TECHNICAL FIELD

The present disclosure belongs to the field of image processing, relates to an end-to-end optimized variable-bit-rate image compression solution with a bit-rate control function, in particular to a variable-bit-rate image compression method and system, an apparatus, a terminal, and a storage medium.

BACKGROUND ART

End-to-end optimization is a technology commonly applied to image compression, it models compression as a rate-distortion optimization problem by using a convolutional neural network so as to be able to jointly optimize each module. By using a variable-bit-rate solution, output image or video sequences with different qualities and different bit-rates can be outputted by single model. It was found by document retrieval for the prior art that Dumas et al. proposed an optimization solution for optimizing parameters of transform networks, quantization step sizes, and entropy model at the same time on the basis of a uniform quantizer solution in "Autoencoder Based Image Compression: Can the Learning be Quantization Independent?" published in the *IEEE International Conference on Acoustics, Speech and Signal Processing* (ICASSP) in 2018. By using this method, variable-bit-rate image encoding can be implemented by adjusting the quantization step size under the condition of constant transform. Choi et al. proposed a conditional autoencoder in "Variable Rate Deep Image Compression With a Conditional Autoencoder" published in the *IEEE/CVF International Conference on Computer Vision* (ICCV) in 2019, so that adaptive transform for different target bit-rates was implemented; and at the same time, a uniform quantizer with a variable quantization step size was adopted in this method, so that variable-bit-rate encoding with adaptive transform and a variable quantization step size was implemented. Zhou et al. proposed a variable-bit-rate encoding method with a dead-zone quantizer in "Variable Rate Image Compression Method with Dead-zone Quantizer" published in *IEEE/CVF Conference on Computer Vision and Pattern Recognition Workshops* (CVPRW) in 2020. However, in this method, the transform network and the quantization step size were not be optimized at the same time, and the optimization was implemented by stages by manually adjusting the quantization step size after training the transform network.

In addition, in these methods, there is a lack of explicit modeling in a relationship between the quantization step size and a bit-rate of a compressed bit-stream or the distortion of a reconstructed image, and the quantization step size cannot be calculated according to a target rate or target distortion. Therefore, when the target bit-rate or the target distortion is given, in these methods, an appropriate quantization step size needs to be obtained by performing binary search on an existing preset bit-rate point. In addition, the dead-zone quantizer implemented by stages does not take full advantage of transform and quantization combined optimization in end-to-end optimization, and thus, the rate distortion performance needs to be improved.

SUMMARY OF THE INVENTION

For overcoming defects in the prior art, objects of the present disclosure are to provide a variable-bit-rate image compression method and system, an apparatus, and a storage medium.

According to an aspect of the present disclosure, provided is a variable-bit-rate image compression method, including:
  forward mapping: obtaining an initial feature map of a to-be-encoded image from the image by a first decomposition transform neural network;
  quantization: quantizing the initial feature map by a dead-zone quantizer to obtain a quantized feature map of the image;
  entropy encoding: performing entropy encoding on the quantized feature map and quantized hyper-prior information involved in an entropy model by using the entropy model to obtain a compressed bit-stream;
  entropy decoding: performing entropy decoding on the compressed bit-stream, and sequentially recovering the quantized hyper-prior information and the quantized feature map by using the entropy model;
  inverse quantization: performing inverse quantization on the recovered quantized feature map to obtain a reconstructed feature map of the image;
  inverse mapping: obtaining a reconstructed image from the reconstructed feature map by a first synthesis transform neural network; and
  bit-rate control: adjusting quantization and inverse quantization parameters in an encoding process according to a target bit-rate or target distortion so that a bit-rate of the compressed bit-stream is close to the target bit-rate or the distortion of the reconstructed image is close to the target distortion.

Preferably, the first decomposition transform neural network includes:
  a down-sampling subnetwork, wherein the down-sampling subnetwork is implemented by a convolutional neural network and is configured to transform an input image into a hidden representation; and
  a reversible encoding subnetwork, wherein the reversible encoding subnetwork is configured to transform the hidden representation into the initial feature map; the reversible encoding subnetwork is obtained by hierarchical arrangement of reversible encoding units, the hierarchical arrangement includes I layers, the $i^{th}$ layer ($1 \leq i \leq I$) includes $2^{i-1}$ reversible encoding units, each of the reversible encoding units is provided with two outputs, and the two outputs of the reversible encoding unit in the $\hat{z}^{th}$ layer are used as inputs of two reversible encoding units in the $(i+1)^{th}$ layer; for the unique reversible encoding unit in the first layer, an input thereof is the hidden representation; and for $2^I$ outputs provided in the $I_{th}$ layer, the initial feature map can be obtained by merging.

Preferably, processes performed in the reversible encoding units include:
  feature decomposition: an input is divided to obtain two paths of sub-signals; and
  reversible encoding: for the two paths of sub-signals $x_1$ and $x_2$, reversible encoding processes thereof include:

$$y_1 = x_1 + \mathcal{F}(x_2; \theta)$$
$$y_2 = x_2 + \mathcal{G}(y_1; \mu)$$

wherein $\mathcal{F}(\bullet; \theta)$ and $\mathcal{G}(\bullet; \mu)$ are both convolutional neural networks.

Preferably, the quantization is to output the quantized feature map meeting requirements for the target bit-rate or the target distortion by adjusting a quantization step size of the dead-zone quantizer; wherein for an element $y$ on any position in the initial feature map, a quantization output thereof is expressed as:

$$C(y; q, z) = \text{sign}(y) \cdot \max\left(0, \left\lfloor \frac{|y|}{q} - \frac{z}{2} + 1 \right\rfloor\right),$$

wherein when y is a positive number, sign(y) is 1, when y is a negative number, sign(y) is −1, and when y is zero, sign(y) is 0; max(a, b) returns the larger one in a, b; $\lfloor y \rfloor$ returns the maximum integer not greater than y; and q is the quantization step size, and z is a dead-zone rate.

Preferably, the entropy encoding includes: estimating Gaussian distribution of elements on the quantized feature map by adopting the entropy model, performing arithmetic encoding on the quantized feature map, and performing arithmetic encoding on the quantized hyper-prior information by adopting structure distribution to obtain the compressed bit-stream.

Preferably, the entropy decoding includes: performing arithmetic decoding on the quantized hyper-prior information by adopting structure distribution, and inputting the quantized hyper-prior information to the entropy model to obtain code word distribution of the quantized feature map; and performing arithmetic decoding on the compressed bit-stream, and recovering the quantized feature map.

Preferably, the entropy model includes:
  a hyper-prior information extraction module configured to obtain the hyper-prior information from the initial feature map of the image by a second decomposition transform network;
  a hyper-prior quantization module configured to perform uniform quantization on the hyper-prior information to generate quantized hyper-prior information;
  a hyper-prior information reconstruction module configured to obtain reconstructed hyper-prior information from the quantized hyper-prior information by a second synthesis transform neural network;
  a context modeling module configured to obtain context information from an encoded and decoded quantized feature map by a context extraction neural network; and
  a distribution estimation module configured to merge the context information with the reconstructed hyper-prior information, and output two outputs having the exactly same sizes as the initial feature map as a mean value and a standard deviation of Gaussian distribution respectively by an information fusion neural network to obtain the distribution of each element on the quantized feature map;
  entropy encoding being performed based on the hyper-prior information extraction module, the hyper-prior quantization module, the hyper-prior information reconstruction module, the reconstructed hyper-prior information and the distribution estimation module; and
  entropy decoding being performed based on the hyper-prior information reconstruction module, the context modeling module and the distribution estimation module.

Preferably, the inverse quantization is an inverse process of the quantization and uses the same quantization step size and dead-zone rate as the quantization, and for an element $\hat{y}$ on any position in the recovered quantized feature map, an inverse quantization output thereof is expressed as:

$$R(\hat{y}; q, z) = \begin{cases} q \cdot \hat{y} - \frac{q(1-z)}{2}, & \text{for } \hat{y} > \frac{1}{2}, \\ qz \cdot \hat{y}, & \text{for } -\frac{1}{2} \le \hat{y} \le \frac{1}{2}, \\ q \cdot \hat{y} + \frac{q(1-z)}{2}, & \text{for } \hat{y} < -\frac{1}{2}. \end{cases}$$

wherein q is the quantization step size, and z is the dead-zone rate.

Preferably, the first synthesis transform neural network includes:
  a reversible decoding subnetwork: the reversible decoding subnetwork transforms the reconstructed feature map into a reconstructed hidden representation; the reversible decoding subnetwork is obtained by hierarchical arrangement of reversible decoding units, the hierarchical arrangement includes I layers, the $i^{th}$ layer ($1 \le i \le I$) includes $2^{I-i+2}$ reversible decoding units; each of the reversible decoding units is provided with two inputs and one output, and outputs of two reversible decoding units in the $i^{th}$ layer are used as inputs of one reversible decoding unit in the $(i+1)^{th}$ layer; $2^I$ inputs of $2^{I-1}$ reversible decoding units in the first layer can be obtained by dividing the reconstructed feature map into $2^I$ components; an output of the unique reversible decoding unit in the $I_{th}$ layer is the reconstructed hidden representation; and parameter reuse is implemented between the reversible decoding subnetwork and the reversible encoding subnetwork; and
  an up-sampling subnetwork: the up-sampling subnetwork is implemented by a convolutional neural network and is configured to transform the reconstructed hidden representation into the reconstructed image.

Preferably, processes performed in the reversible decoding units include:
  reversible decoding: for two paths of input signals $\hat{y}_1$ and $\hat{y}_2$, reversible decoding processes thereof include:

$$\hat{x}_2 = \hat{y}_2 - \mathcal{G}(\hat{y}_1; \mu)$$
$$\hat{x}_1 = \hat{y}_1 - \mathcal{F}(\hat{x}_2; \theta)$$

wherein $\mathcal{F}(\bullet; \theta)$ and $\mathcal{G}(\bullet; \mu)$ are both convolutional neural networks, and θ and μ are respectively trainable tests for the two convolutional neural networks; and feature decomposition: $\hat{x}_1$ and $\hat{x}_2$ are merged to obtain an output signal.

Preferably, parameters of the first decomposition transform neural network, the first synthesis transform neural network and the entropy model are obtained by iterative learning based on a training image set, which includes:

training image set obtaining: using the training image set as the to-be-encoded image;

forward mapping: obtaining the initial feature map of the to-be-encoded image from the image by the first decomposition transform neural network;

quantization surrogation: quantizing the feature map by the dead-zone quantizer to obtain a noised feature map of the image, wherein for an element $y$ on any position in the initial feature map, a quantization output thereof is expressed as:

$$\hat{y} = \beta(y; q, z) + n$$

wherein n is random uniform noise within a value range of [−½, ½], and β(y; q, z) meets:

$$\beta(y; q, z) = \begin{cases} \frac{y}{q} - \frac{z-1}{2}, & \text{for } y > \frac{qz}{2}, \\ \frac{y}{qz}, & \text{for } -\frac{qz}{2} \le y \le \frac{qz}{2}, \\ \frac{y}{q} + \frac{z-1}{2}, & \text{for } y < -\frac{qz}{2}. \end{cases}$$

wherein q is a quantization step size, and z is a dead-zone rate;

entropy estimation: inputting the noised feature map to the entropy model, and outputting Gaussian distribution of an element on each position of the noised feature map, wherein a symbolic probability of an element ỹ on any position is expressed as:

$$p_{\tilde{y}}(\hat{y}) = \int_{\hat{y}-0.5}^{\hat{y}+0.5} \frac{1}{\sigma\sqrt{2\pi}} e^{-\frac{1}{2}\left(\frac{\hat{y}-\mu}{\sigma}\right)^2} d\hat{y}$$

wherein μ and σ are respectively a mean value and a variance of estimated Gaussian distribution; in addition, any element in noised hyper-prior information in the entropy model is marked as z̃, and the symbolic probability obtained by structure distribution calculation is $p_{\tilde{z}}(\tilde{z})$; and empirical entropies of the noised feature map and the noised hyperprior information are encoded as $\mathcal{L} = -\Sigma_y \log_2(p_{ij})(\tilde{y})) - \Sigma_z \log_2(p_z)(\tilde{z}))$;

inverse quantization: performing inverse quantization on the noised feature map to obtain a reconstructed feature map of the image, wherein for an element ỹ on any position in the noised feature map, an inverse quantization output thereof is expressed as:

$$\beta^{-1}(y; q, z) = \begin{cases} q \cdot \hat{y} - \frac{q(1-z)}{2}, & \text{for } \hat{y} > \frac{1}{2}, \\ qz \cdot \hat{y}, & \text{for } -\frac{qz}{2} \le \hat{y} \le \frac{1}{2}, \\ q \cdot \hat{y} + \frac{q(1-z)}{2}, & \text{for } \hat{y} < -\frac{1}{2}. \end{cases}$$

wherein q is a quantization step size, and z is a dead-zone rate;

inverse mapping: obtaining the reconstructed image from the reconstructed feature map by the first synthesis transform neural network;

distortion estimation: marking the to-be-encoded image as X, marking a size as H×W, marking the reconstructed image as X̃, and marking reconstruction distortion as $$\mathcal{L}_D = \frac{1}{HW} \|X - \tilde{X}\|_2^2;$$

and gradient update: by predetermining the dead-zone rate and giving N different quantization step sizes, obtaining N groups of empirical entropies and reconstruction distortion respectively marked as $\mathcal{L}_R^{(1)}, \mathcal{L}_R^{(2)}, \ldots, \mathcal{L}_R^{(N)}$ and $\mathcal{L}_D^{(1)}, \mathcal{L}_D^{(2)}, \ldots, \mathcal{L}_D^{(N)}$), and predetermining N Lagrangian multipliers $\lambda_1, \lambda_2, \ldots, \lambda_N$ therefor; and in a training process, randomly adopting a quantization step size every time to obtain a loss function $\mathcal{L}_R^{(i)} + \lambda_i \cdot \mathcal{L}_D^{(i)}$ adopted this time, and updating the parameters of the neural networks by backpropagation.

Preferably, the bit-rate control includes:

bit-rate calculation: inputting a size H×W of the to-be-encoded image and a bit number s of the compressed bit-stream, and calculating the bit-rate of the compressed bit-stream as $$r = \frac{s}{HW};$$

distortion calculation: marking the to-be-encoded image as X, marking a size as H×W, marking the reconstructed image as X̃, and marking reconstruction distortion as $$\frac{1}{HW} \|X - \tilde{X}\|_2^2;$$

quantization step size-bit-rate modeling: performing quantization three times with different quantization step sizes, entropy encoding and bit-rate calculation on the initial feature map to obtain three groups of quantization step sizes and the bit-rate of the compressed bit-stream, and fitting a quantization step size-bit-rate model as:

$$\frac{1}{q} = \alpha R^2 + \beta R + \gamma,$$

wherein q is the quantization step size, R is the bit-rate, and α, β and γ are three to-be-fitted parameters;

quantization step size-distortion modeling: performing repeated quantization with different quantization step sizes, inverse quantization, inverse mapping and distortion calculation on the initial feature map to obtain a plurality of groups of quantization step sizes and distortion of the reconstructed image, and fitting a quantization step size-distortion model as:

$$\frac{1}{q} = \frac{\zeta}{D} + \eta \log D + \iota,$$

wherein q is the quantization step size, D is the bit-rate, and $\zeta$, $\eta$ and $\iota$ are three to-be-fitted parameters; and quantization step size decision making: giving a target bit-rate $\overline{R}$ or target distortion $\overline{D}$, and inferring the corresponding quantization step size $(\alpha \overline{R}^2 + \beta \overline{R} + \gamma)^{-1}$ or $(\zeta/\overline{D} + \eta \log \overline{D} + \iota)^{-1}$ according to the quantization step size-bit-rate model or the quantization step size-distortion model.

According to a second aspect of the present disclosure, provided is a variable-bit-rate image compression system, including:

a forward mapping module configured to obtain an initial feature map of a to-be-encoded image from the image by a first decomposition transform neural network;

a quantization module configured to quantize the feature map by a dead-zone quantizer to obtain a quantized feature map of the image;

an entropy encoding module configured to perform entropy encoding on the quantized feature map and quantized hyper-prior information involved in an entropy model by using the entropy model to obtain a compressed bit-stream;

an entropy decoding module configured to perform entropy decoding on the compressed bit-stream, and sequentially recover the quantized hyper-prior information and the quantized feature map by using the entropy model;

an inverse quantization module configured to perform inverse quantization on the quantized feature map to obtain a reconstructed feature map of the image;

an inverse mapping module configured to obtain a reconstructed image from the reconstructed feature map by a first synthesis transform neural network; and a bit-rate control module configured to adjust quantization and inverse quantization parameters in an encoding process according to a target bit-rate or target distortion so that a bit-rate of the compressed bit-stream is close to the target bit-rate or the distortion of the reconstructed image is close to the target distortion.

According to a third aspect of the present disclosure, provided is an image compression apparatus, configured for image compression by adopting the variable-bit-rate image compression method of any one mentioned above.

According to a fourth aspect of the present disclosure, provided is a terminal, including a memory, a processor and a computer program stored in the memory and capable of running on the processor, wherein the processor, when executing the program, can be configured to perform the method of any one mentioned above, or operating the system, or operating the apparatus.

According to a fifth aspect of the present disclosure, provided is a computer-readable storage medium having a computer program stored thereon, wherein the program, when executed by a processor, can be configured to perform the method of any one mentioned above, or operating the system, or operating the apparatus.

Compared with the prior art, the present disclosure has the following beneficial effects:

according to the variable-bit-rate image compression method and system in the embodiments of the present disclosure, the forward mapping and the inverse mapping can approach to orthogonal transform in local space, quantization and inverse quantization based on the dead-zone quantizer can improve the rate distortion performance in a variable-bit-rate scenario, and bit-rate control can provide a precise bit-rate control solution, so that the bit-rate of the compressed bit-stream can better adapt to the dynamic change of a network bandwidth and have an extremely high actual application value.

According to the variable-bit-rate image compression method and system in the embodiments of the present disclosure, the first decomposition transform neural network, the first synthesis transform neural network and reversible encoding units are arranged in a novel mode and are in hierarchical arrangement, and each of the reversible encoding units has a feature decomposition module/process.

According to the variable-bit-rate image compression method and system in the embodiments of the present disclosure, in term of bit-rate control, the neural networks implemented according to the technical solutions in the present embodiments can approach to orthogonal transform in local space, so that the average performance of variable-bit-rate encoding is improved; and fewer parameters are needed, so that storage costs of models required for implementing bit-rate control can be effectively reduced.

BRIEF DESCRIPTION OF THE DRAWINGS

By reading detailed description for nonrestrictive embodiments with reference to the following accompanying drawings, other features, objects and advantages of the present disclosure will become more apparent.

DETAILED DESCRIPTION OF PREFERRED EMBODIMENTS

The present disclosure will be described in detail below in conjunction with specific embodiments. The following embodiments will be beneficial for the skilled in the art to further understand the present disclosure, but are not intended to limit the present disclosure in any form. It should be indicated that those of ordinary skill in the art can further make several transforms and improvements without departing from the concept of the present disclosure. These transforms and improvements shall fall within the protective scope of the present disclosure.

Figure 1:
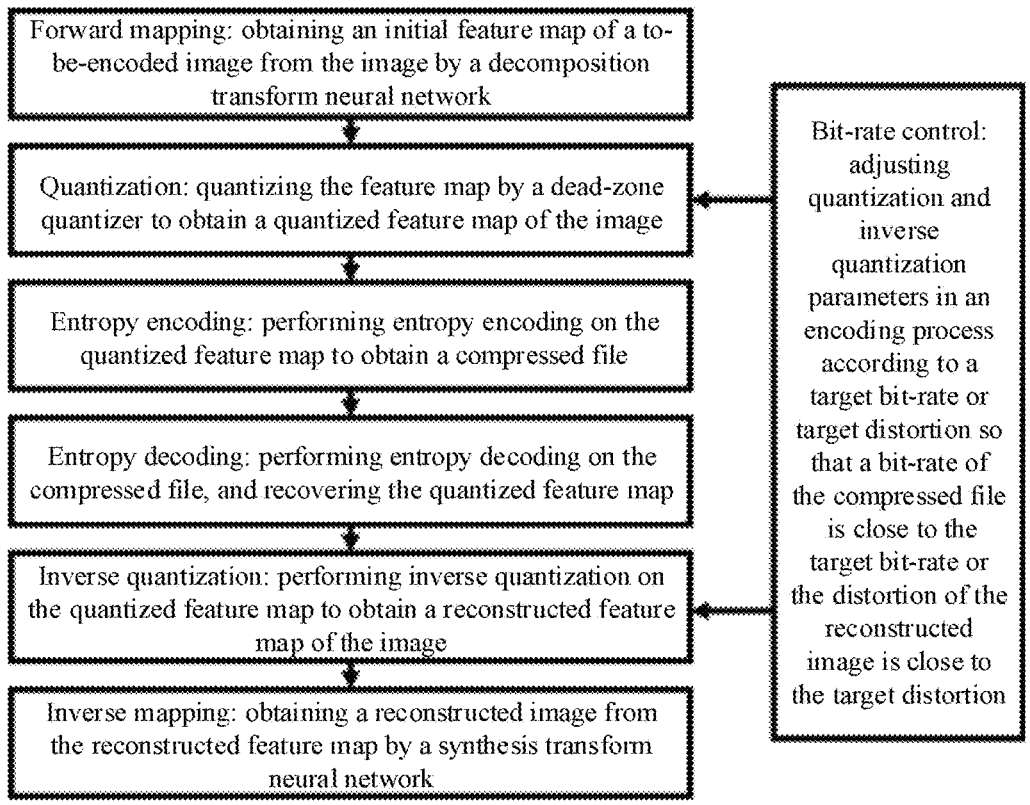
FIG. 1 is a flow diagram showing a variable-bit-rate image compression method in an embodiment of the present disclosure.

The present disclosure provides an embodiment, and referring to FIG. 1, a variable-bit-rate image compression method includes:

S100, forward mapping: an initial feature map of a to-be-encoded image is obtained from the image by a first decomposition transform neural network;

S200, quantization: the initial feature map in S100 is quantized by a dead-zone quantizer to obtain a quantized feature map of the image;

S300, entropy encoding: entropy encoding is performed on the quantized feature map in S200 and quantized hyper-prior information involved in an entropy model by using the entropy model to obtain a compressed bit-stream;

S400, entropy decoding: entropy decoding is performed on the compressed bit-stream in S300, and the quantized hyper-prior information and the quantized feature map in S300 are sequentially recovered by using the entropy model;

S500, inverse quantization: inverse quantization is performed on the quantized feature map in S200 to obtain a reconstructed feature map of the image;

S600, inverse mapping: a reconstructed image is obtained from the reconstructed feature map in S500 by a first synthesis transform neural network; and S700, bit-rate control: quantization and inverse quantization parameters in an encoding process are adjusted according to a target bit-rate or target distortion so that a bit-rate of the compressed bit-stream in S300 is close to the target bit-rate or the distortion of the reconstructed image in S600 is close to the target distortion.

The present embodiment provides an accurate bit-rate control solution, makes the bit-rate of the compressed bit-stream better adapt to the dynamic change of a network bandwidth, and has an extremely high actual application value.

In the embodiment of the present disclosure, a bit-rate control solution for a given target bit-rate is implemented on a Kodak data set.

In a preferred embodiment, S100 is performed by the specific implementation steps:

forward mapping: an initial feature map of a to-be-encoded image with a size of H×W is obtained from the image by a first decomposition transform neural network. The first decomposition transform neural network is formed by sequentially connecting a down-sampling subnetwork and a reversible encoding subnetwork. The down-sampling subnetwork is composed of four convolutional layers and GDN (Generalized Divisive Normalization) layers, all the convolutional layers have a convolutional kernel with a size of 5×5, a convolutional step size of 2, and 192, 192, 192 and 320 output channels respectively, and one of the GDN layers is provided between every two of the convolutional layers. A hidden representation with a size of $$\frac{H}{16} \times \frac{W}{16} \times 320$$

can be obtained from the to-be-encoded image with a size of H×W by the down-sampling subnetwork. The reversible encoding subnetwork includes three-hierarchy reversible encoding modules with each including 1, 2 and 4 reversible encoding units, the $i^{th}$ reversible encoding unit ($0 \le i \le 2^j-1$) in the $j^{th}$ layer ($0 \le j \le 2$) is marked as $\mathcal{M}_i^{(j)}$, an input thereof is marked as $x_i^{(j)}$, and an output thereof includes two elements: $x_{2i}^{(j+1)}$ and $x_{2i+1}^{(j+1)}$, i.e., inputs of the $2i^{th}$ reversible encoding unit and the $(2i+1)^{th}$ reversible encoding unit in the $j^{th}$ layer. For each reversible encoding unit, firstly, $x_i^{(j)}$ is divided in channel dimension to obtain two hidden representations $\tilde{x}_{2i}^{(j)}$ and $\tilde{x}_{2i+1}^{(j)}$ with a size of $$\frac{H}{16} \times \frac{W}{16} \times \frac{320}{2^{j+1}}.$$

Next, a calculation process for the output is expressed as:

$$x_{2i}^{(j+1)} = \tilde{x}_{2i}^{(j)} + \mathcal{F}_i^{(j)}(\tilde{x}_{2i+1}^{(j)}; \theta_i^{(j)})$$
$$x_{2i+1}^{(j+1)} = \tilde{x}_{2i+1}^{(j)} + \mathcal{G}_i^{(j)}(x_{2i}^{(j+1)}; \mu_i^{(j)})$$

wherein $\mathcal{F}_i^{(j)}(\bullet; \theta_i^{(j)})$ and $\mathcal{G}_i^{(j)}(\bullet; \mu_i^{(j)})$ are both composed of convolutional neural networks with the same structure, including three convolutional layers: each convolutional layer has $$\frac{320}{2^{j+1}}$$

output channels, a convolutional kernel with a size of 3 and a convolutional step size of 1, and the first two convolutional layers are both followed by nonlinear units. By means of the three-hierarchy reversible encoding modules, 8 hidden representations with a size of $$\frac{H}{16} \times \frac{W}{16} \times 40$$

can be obtained, and an initial feature map with a size of $$\frac{H}{16} \times \frac{W}{16} \times 320$$

can be obtained by connecting the hidden representations in channel dimension.

In the present embodiment, the forward mapping can approach to orthogonal transform in local space, so that the average performance of variable-bit-rate encoding is improved.

In a preferred embodiment of the present disclosure, S200 is performed for quantizing the initial feature map by a dead-zone quantizer with a quantization step size of $\bar{q}$ and a dead-zone rate of 1 to obtain a quantized feature map $\bar{y}$, which specifically includes:

the quantized feature map meeting requirements for the target bit-rate or the target distortion is outputted by adjusting a quantization step size of the dead-zone quantizer, wherein for an element y on any position in the initial feature map, a quantization output thereof is expressed as:

$$C(y; q, z) = \text{sign}(y) \cdot \max\left(0, \left\lfloor \frac{|y|}{q} - \frac{z}{2} + 1 \right\rfloor\right),$$

wherein when y is a positive number, sign(y) is 1, when y is a negative number, sign(y) is −1, and when y is zero, sign(y) is 0; max(a, b) returns the larger one in a, b; $\lfloor y \rfloor$ returns the maximum integer not greater than y; and q is the quantization step size, and z is a dead-zone rate.

By means of the quantization in the present embodiment, the quantization step size is adjusted in a variable-bit-rate encoding scenario, and the purpose of controlling the bit-rate by adjusting the quantization step size is achieved, so that the rate distortion performance in a variable-bit-rate scenario is improved.

In a preferred embodiment of the present disclosure, S300 is performed for entropy encoding. The distribution of elements on the quantized feature map is estimated by adopting the entropy model, arithmetic encoding is performed on the quantized feature map, and arithmetic encoding is performed on the quantized hyper-prior information by adopting structure distribution to obtain the compressed bit-stream, which specifically includes the following six steps:

S31, hyper-prior information extraction: the hyper-prior information is obtained from the initial feature map of the image by a second decomposition transform network. The second decomposition transform network is composed of three convolutional layers and LeakyReLU layers. The first convolutional layer has a convolutional kernel with a size of 3×3, a convolutional step size of 1, and 192 output channels. The last two convolutional layers have a convolutional kernel with a size of 5×5, a convolutional step size of 2, and 192 output channels respectively. One of the LeakyReLU layers is provided between every two of the three convolutional layers;

S32, hyper-prior quantization: uniform quantization is performed on the hyper-prior information to generate quantized hyper-prior information;

S33, hyper-prior information reconstruction: reconstructed hyper-prior information is obtained from the quantized hyper-prior information by a second synthesis transform neural network. The second synthesis transform neural network is composed of three deconvolutional layers and LeakyReLU layers. The first two deconvolutional layers have a convolutional kernel with a size of 5×5, a convolutional step size of 2, and 320 and 480 output channels respectively. The last deconvolutional layer has a convolutional kernel with a size of 3×3, a convolutional step size of 1, and 640 output channels respectively. One of the LeakyReLU layers is provided between every two of the three deconvolutional layers;

S34, context modeling: context information is obtained from an encoded quantized feature map by a context extraction neural network;

S35, distribution estimation: the context information is merged with the reconstructed hyper-prior information, and two output items having the exactly same sizes as the initial feature map are outputted as a mean value and a standard deviation of Gaussian distribution respectively by an information fusion neural network to obtain the distribution of each element on the quantized feature map. The information fusion neural network is composed of three convolutional layers and LeakyReLU layers, and all the convolutional layers have a convolutional kernel with a size of 1×1, a convolutional step size of 1, and 1280, 1067 and 640 output channels respectively; and S36, arithmetic encoding: arithmetic encoding is performed on the quantized feature map by adopting estimated distribution of elements on the quantized feature map, and arithmetic encoding is performed on the quantized hyper-prior information by adopting structure distribution to obtain the compressed bit-stream.

In a preferred embodiment of the present disclosure, S400 is performed for entropy decoding. Arithmetic decoding is performed on the quantized hyper-prior information by adopting structure distribution, and the quantized hyper-prior information is inputted to the entropy model to obtain code word distribution of the quantized feature map; and arithmetic decoding is performed on the compressed bit-stream, and the quantized feature map is recovered. The step specifically includes the following steps:

S40, hyper-prior arithmetic decoding: arithmetic decoding is performed on the quantized hyper-prior information by adopting structure distribution to obtain the quantized hyper-prior information;

S41, hyper-prior information reconstruction: reconstructed hyper-prior information is obtained from the quantized hyper-prior information by a second synthesis transform neural network;

S42, context modeling: context information is obtained from an encoded quantized feature map by a context extraction neural network;

S43, distribution estimation: the context information is merged with the reconstructed hyper-prior information, and two output items having the exactly same sizes as the initial feature map are outputted as a mean value and a standard deviation of Gaussian distribution respectively by an information fusion neural network to obtain the distribution of each element on the quantized feature map; and S44, arithmetic decoding: arithmetic encoding is performed on the quantized feature map by adopting estimated distribution of elements on the quantized feature map.

In a preferred embodiment of the present disclosure, the entropy model is introduced. Specifically, the entropy model includes:

a hyper-prior information extraction module configured to obtain the hyper-prior information from the initial feature map of the image by a second decomposition transform network;

a hyper-prior quantization module configured to perform uniform quantization on the hyper-prior information to generate quantized hyper-prior information;

a hyper-prior information reconstruction module configured to obtain reconstructed hyper-prior information from the quantized hyper-prior information by a second synthesis transform neural network;

a context modeling module configured to obtain context information from an encoded and decoded quantized feature map by a context extraction neural network; and a distribution estimation module configured to merge the context information with the reconstructed hyper-prior information, and output two output items having the exactly same sizes as the initial feature map as a mean value and a standard deviation of Gaussian distribution respectively by an information fusion neural network to obtain the distribution of each element on the quantized feature map;

entropy encoding being performed based on the hyper-prior information extraction module, the hyper-prior quantization module, the hyper-prior information reconstruction module, the reconstructed hyper-prior information and the distribution estimation module; and entropy decoding being performed based on the hyper-prior information reconstruction module, the context modeling module and the distribution estimation module.

In a preferred embodiment of the present disclosure, S500 is performed for inverse quantization. The inverse quantization is an inverse process of the quantization and uses the same quantization step size and dead-zone rate as the quantization, and for an element $\hat{y}$ on any position in the quantized feature map, an inverse quantization output thereof is expressed as:

$$R(\hat{y}; q, z) = \begin{cases} q \cdot \hat{y} - \dfrac{q(1-z)}{2}, & \text{for } \hat{y} > \dfrac{1}{2} \\ qz \cdot \hat{y}, & \text{for } -\dfrac{1}{2} \leq \hat{y} \leq \dfrac{1}{2} \\ q \cdot \hat{y} + \dfrac{q(1-z)}{2}, & \text{for } \hat{y} < -\dfrac{1}{2} \end{cases}$$

wherein q is the quantization step size, and z is the dead-zone rate.

In the present embodiment, a reconstructed feature with a size of $$\frac{H}{16} \times \frac{W}{16} \times 320$$

is obtained by inverse quantization. In the present embodiment, the inverse quantization can improve the rate distortion performance in a variable-bit-rate scenario.

In a preferred embodiment of the present disclosure, S500 is performed for obtaining the reconstructed image from the reconstructed feature map by the first synthesis transform neural network. A specific process is that the decomposition transform neural network is formed by sequentially connecting a reversible decoding subnetwork and an up-sampling subnetwork. The reversible decoding subnetwork firstly divides the reconstructed feature map in channel dimension to obtain 8 hidden representations $\{\hat{x}_0^{(0)}, \hat{x}_1^{(0)}, \ldots, \hat{x}_7^{(0)}\}$ with a size of $$\frac{H}{16} \times \frac{W}{16} \times 40.$$

The up-sampling subnetwork also includes three-hierarchy reversible encoding modules arranged in a way opposite to that of the reversible encoding subnetwork and respectively include 4, 2 and 1 reversible decoding unit. The first ($0 \leq l \leq 2^{2-k}-1$) reversible encoding unit on the $k^{th}$ layer ($0 \leq k \leq 2$) is marked as $\widehat{\mathcal{M}}_l^{(k)}$, inputs thereof are $\hat{x}_{2l}^{(k)}$ and $\hat{x}_{2l+1}^{(k)}$, and an output thereof is $\hat{x}_l^{(k+1)}$. A calculation process for each reversible decoding module includes two steps. In the first step, formulae are expressed as:

$$\hat{x}_{2l+1}^{(k+1)} = \hat{x}_{2l+1}^{(k)} - \mathcal{G}_l^{(2-k)}(\hat{x}_{2l}^{(k)}; \mu_l^{(2-k)})$$

$$\hat{x}_{2l}^{(k+1)} = \hat{x}_{2l}^{(k)} - \mathcal{F}_l^{(2-k)}(\hat{x}_{2l+1}^{(k+1)}; \theta_l^{(2-k)})$$

wherein $\mathcal{F}_i^{(j)}(\bullet; \theta_i^{(j)})$ and $\mathcal{G}_i^{(j)}(\bullet; \mu_i^{(j)})$ are the same as $\mathcal{F}_i^{(j)}(\bullet; \theta_i^{(j)})$ and $\mathcal{G}_i^{(j)}(\bullet; \mu_i^{(j)})$ in the reversible encoding subnetwork in the decomposition transform neural network. In the second step, $\hat{x}_{2l}^{(k+1)}$ and $\hat{x}_{2l+1}^{(k+1)}$ are merged on a channel to obtain $\hat{x}_l^{(k+1)}$ as an output of the reversible encoding unit. A hidden representation with a size of $$\frac{H}{16} \times \frac{W}{16} \times 320$$

can be obtained by three-hierarchy reversible decoding modules. The up-sampling subnetwork is composed of four deconvolutional layers and iGDN (inverse Generalized Divisive Normalization) layers, all the deconvolutional layers have a convolutional kernel with a size of 5×5, a convolutional step size of 2, and 192, 192, 192 and 3 output channels respectively, and one of the iGDN layers is provided between every two of the convolutional layers. An output of the up-sampling subnetwork is a reconstructed image with a size of H×W.

In a preferred embodiment of the present disclosure, S700 is performed for bit-rate control: quantization and inverse quantization parameters in an encoding process are adjusted according to a target bit-rate $\bar{r}$ so that a bit-rate of the compressed bit-stream is close to the target bit-rate or the distortion of the reconstructed image is close to the target distortion. This step includes the following five substeps:

S71, quantization: quantization is performed on the initial feature map three times by a dead-zone quantizer with quantization step sizes $q_0$, $q_1$ and $q_2$ and a dead zone rate of 1 to obtain quantized feature maps $\hat{y}_0$, $\hat{y}_1$ and $\hat{y}_2$ respectively;

S72, entropy encoding: entropy encoding is performed on the three feature maps respectively to obtain encoded compressed bit-streams having $s_0$, $s_1$ and $s_2$ code words respectively;

S73, bit-rate calculation: when an input image has a size of H×W, and a compressed bit-stream has a size of s, the bit-rate of the compressed bit-stream can be obtained as $$R = \frac{s}{H \times W}.$$

By calculation, the bit-rates of the above-mentioned three compressed bit-streams are marked as $R_0$, $R_1$ and $R_2$ respectively;

S74, quantization step size-bit-rate modeling: $q_0$, $q_1$ and $q_2$ are fitted with $R_0$, $R_1$ and $R_2$ to obtain $$\frac{1}{q} = \alpha R^2 + \beta R + \gamma,$$

and parameters $\alpha$, $\beta$ and $\gamma$ are determined to obtain a quantization step size-bit-rate model $$\frac{1}{q} = \alpha R^2 + \beta R + \gamma;$$

and

S75, quantization step size decision making: a target bit-rate $\bar{R}$ is inputted to the quantization step size-bit-rate model to obtain a quantization step size $\bar{q} = (\alpha \bar{R}^2 + \beta \bar{R} + \gamma)^{-1}$ corresponding to the target bit-rate.

A test on the Kodak data set indicates that when the target bit-rate is set as 0.25, 0.50, 0.75, 1.00 or 1.25 bpp, a mean value of absolute errors between the bit-rates of the compressed bit-streams and the target bit-rate is 0.0118 bpp.

In the present embodiment, in term of bit-rate control, the neural networks implemented according to the technical solutions in the present embodiment can approach to orthogonal transform in local space, so that the average performance of variable-bit-rate encoding is improved; and fewer parameters are needed, so that storage costs of models required for implementing bit-rate control can be effectively reduced.

Figure 2:
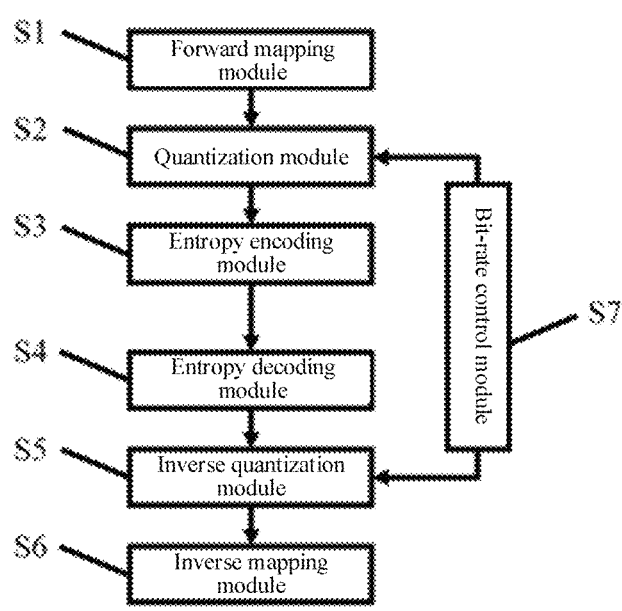
FIG. 2 is a flow diagram showing a variable-bit-rate image compression system in another embodiment of the present disclosure.

Based on the same inventive concept, an embodiment of the present disclosure further provides an image compression system, referring to FIG. 2, including a forward mapping module, a quantization module, an entropy encoding module, an entropy decoding module, an inverse quantization module, an inverse mapping module, and a bit-rate control module; wherein the forward mapping module is configured to obtain an initial feature map of a to-be-encoded image from the image by a first decomposition transform neural network; the quantization module is configured to quantize the feature map by a dead-zone quantizer to obtain a quantized feature map of the image; the entropy encoding module is configured to perform entropy encoding on the quantized feature map and quantized hyper-prior information involved in an entropy model by using the entropy model to obtain a compressed bit-stream; the entropy decoding module is configured to perform entropy decoding on the compressed bit-stream, and sequentially recover the quantized hyper-prior information and the quantized feature map by using the entropy model; the inverse quantization module is configured to perform inverse quantization on the quantized feature map to obtain a reconstructed feature map of the image; the inverse mapping module is configured to obtain a reconstructed image from the reconstructed feature map by a first synthesis transform neural network; and the bit-rate control module is configured to adjust quantization and inverse quantization parameters in an encoding process according to a target bit-rate or target distortion so that a bit-rate of the compressed bit-stream is close to the target bit-rate or the distortion of the reconstructed image is close to the target distortion.

Figure 3:
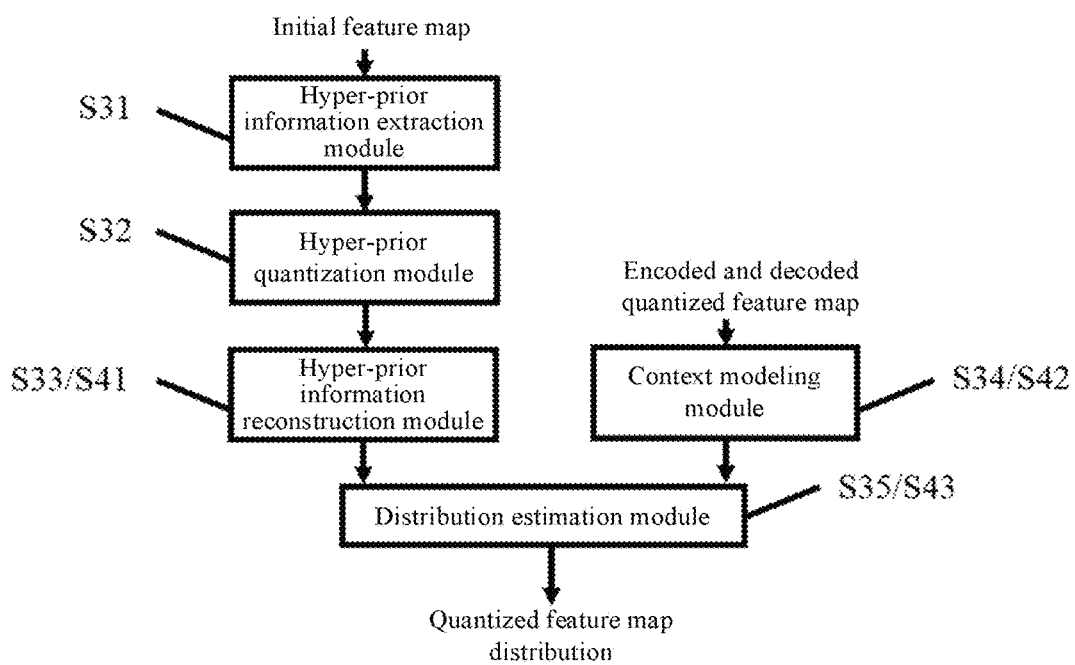
FIG. 3 is a flow diagram showing an entropy encoding module and an entropy decoding module in a preferred embodiment of the present disclosure.
Figure 4:
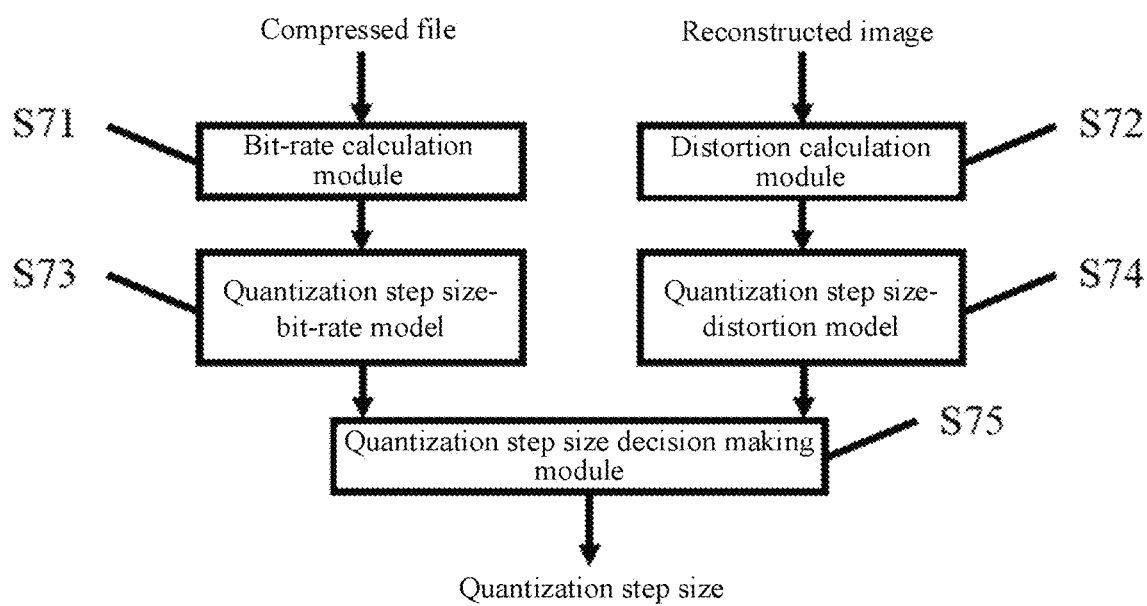
FIG. 4 is a flow diagram showing a bit-rate control module in a preferred embodiment of the present disclosure.

Each module/unit (referring to FIG. 3 and FIG. 4) in the above-mentioned embodiment of the present disclosure can specifically refer to an implementation technology for steps corresponding to the variable-bit-rate image compression method in the above-mentioned embodiment so as to be no longer repeated herein.

Based on the same inventive concept, an embodiment of the present disclosure further provides an image compression apparatus, configured for image compression by adopting the variable-bit-rate image compression method of any one mentioned above.

Based on the same inventive concept, an embodiment of the present disclosure further provides a terminal, including a memory, a processor and a computer program stored in the memory and capable of running on the processor, wherein the processor, when executing the program, can be configured to perform the method of any one mentioned above, or operating the system, or operating the apparatus.

Based on the same inventive concept, an embodiment of the present disclosure further provides a computer-readable storage medium having a computer program stored thereon, wherein the program, when executed by a processor, can be configured to perform the method of any one mentioned above, or operating the system, or operating the apparatus.

The specific embodiments of the present disclosure have been described as above. It should be understood that the present disclosure is not limited to the above-mentioned specific implementations, and the skilled in the art can make various transforms or modifications within the scope defined in the claims, which does not affect essential contents of the present disclosure. All of the above-mentioned preferred features can be arbitrarily combined for use without conflicts with each other.

What is claimed is:

1. A variable-bit-rate image compression method, comprising:
   forward mapping: performing forward mapping on a to-be-encoded image through a first decomposition transform neural network to obtain an initial feature map of the to-be-encoded image;
   quantization: quantizing the initial feature map by a dead-zone quantizer to obtain a quantized feature map of the image;
   entropy encoding: performing entropy encoding on the quantized feature map and quantized hyper-prior information involved in an entropy model by using the entropy model to obtain a compressed bit-stream;
   entropy decoding: performing entropy decoding on the compressed bit-stream, and sequentially recovering the quantized hyper-prior information and the quantized feature map by using the entropy model;
   inverse quantization: performing inverse quantization on the recovered quantized feature map to obtain a reconstructed feature map of the image;
   inverse mapping: performing inverse mapping on the reconstructed feature map through a first synthesis transform neural network to obtain a reconstructed image; and
   bit-rate control: adjusting quantization and inverse quantization parameters in an encoding process according to a target bit-rate or target distortion so that a bit-rate of the compressed bit-stream is close to the target bit-rate or a distortion of the reconstructed image is close to the target distortion;
   the first decomposition transform neural network comprising:
   a down-sampling subnetwork, wherein the down-sampling subnetwork is implemented by a convolutional neural network and is configured to transform an input image into a hidden representation; and
   a reversible encoding subnetwork, wherein the reversible encoding subnetwork is configured to transform the hidden representation into the initial feature map; the reversible encoding subnetwork is obtained by hierarchical arrangement of reversible encoding units, the hierarchical arrangement comprises/layers, the $i^{th}$ layer ($1 \leq i \leq I$) comprises $2^{i-1}$ reversible encoding units, each of the reversible encoding units is provided with two outputs, and the two outputs of the reversible encoding unit in the $i^{th}$ layer are used as inputs of two reversible encoding units in the $(i+1)^{th}$ layer; for the unique reversible encoding unit in the first layer, an input thereof is the hidden representation; and for $2^I$ outputs provided in the $I^{th}$ layer, the initial feature map can be obtained by merging.

2. The variable-bit-rate image compression method according to claim 1, wherein processes performed in the reversible encoding units comprise:
   feature decomposition, wherein an input is divided to obtain two paths of sub-signals; and
   reversible encoding, wherein for two paths of sub-signals $x_1$ and $x_2$, reversible encoding processes thereof comprise:

$$y_1 = x_1 + \mathcal{F}(x_2; \theta)$$

$$y_2 = x_2 + \mathcal{G}(y_1; \mu)$$

wherein $F(\bullet; \theta)$ and $G(\bullet; \mu)$ are both convolutional neural networks.

3. The variable-bit-rate image compression method according to claim 1, wherein the quantization is to output the quantized feature map meeting requirements for the target bit-rate or the target distortion by adjusting a quantization step size of the dead-zone quantizer; wherein for an element y on any position in the initial feature map, a quantization output thereof is expressed as:

$$C(y; q, z) = \text{sign}(y) \cdot \max\left(0, \left\lfloor \frac{|y|}{q} - \frac{z}{2} + 1 \right\rfloor\right),$$

wherein when y is a positive number, sign(y) is 1, when y is a negative number, sign(y) is −1, and when y is zero, sign(y) is 0; max(a, b) returns the larger one in a, b; $\lfloor y \rfloor$ returns the maximum integer not greater than y; and q is the quantization step size, and z is a dead-zone rate.

4. The variable-bit-rate image compression method according to claim 1, wherein
the entropy encoding comprises: estimating Gaussian distribution of elements on the quantized feature map by adopting the entropy model, performing arithmetic encoding on the quantized feature map, and performing arithmetic encoding on the quantized hyper-prior information by adopting structure distribution to obtain the compressed bit-stream.

5. The variable-bit-rate image compression method according to claim 1, wherein the entropy decoding comprises: performing arithmetic decoding on the quantized hyper-prior information by adopting structure distribution, and inputting the quantized hyper-prior information to the entropy model to obtain code word distribution of the quantized feature map; and performing arithmetic decoding on the compressed bit-stream, and recovering the quantized feature map.

6. The variable-bit-rate image compression method according to claim 1, wherein the inverse quantization is an inverse process of the quantization and uses the same quantization step size and dead-zone rate as the quantization, and for an element $\hat{y}$ on any position in the recovered quantized feature map, an inverse quantization output thereof is expressed as:

$$R(\hat{y}; q, z) = \begin{cases} q \cdot \hat{y} - \frac{q(1-z)}{2}, & \text{for } \hat{y} > \frac{1}{2}, \\ q \cdot \hat{y} & \text{for } -\frac{1}{2} \le \hat{y} \le \frac{1}{2}, \\ q \cdot \hat{y} + \frac{q(1-z)}{2}, & \text{for } \hat{y} < -\frac{1}{2}. \end{cases}$$

wherein q is the quantization step size, and z is the dead-zone rate.

7. The variable-bit-rate image compression method according to claim 1, wherein the first synthesis transform neural network comprises:
a reversible decoding subnetwork, wherein the reversible decoding subnetwork transforms the reconstructed feature map into a reconstructed hidden representation; the reversible decoding subnetwork is obtained by hierarchical arrangement of reversible decoding units, the hierarchical arrangement comprises/layers, the $i^{th}$ layer ($1 \le i \le I$) comprises $2^{I-i+2}$ reversible decoding units; each of the reversible decoding units is provided with two inputs and one output, and outputs of two reversible decoding units in the $i^{th}$ layer are used as inputs of one reversible decoding unit in the $(i+1)^{th}$ layer; $2^{I-1}$ inputs reversible decoding units in the first layer can be obtained by dividing the reconstructed feature map into $2^I$ components; an output of the unique reversible decoding unit in the $I^{th}$ layer is the reconstructed hidden representation; and parameter reuse is implemented between the reversible decoding subnetwork and the reversible encoding subnetwork; and
an up-sampling subnetwork, wherein the up-sampling subnetwork is implemented by a convolutional neural network and is configured to transforming the reconstructed hidden representation into the reconstructed image.

8. The variable-bit-rate image compression method according to claim 7, wherein processes performed in the reversible decoding units comprise:
reversible decoding, wherein for two paths of input signals $\hat{y}_1$ and $\hat{y}_2$, reversible decoding processes thereof comprise:

$$\hat{x}_2 = \hat{y}_2 - \mathcal{G}(\hat{y}_1; \mu)$$
$$\hat{x}_1 = \hat{y}_1 - \mathcal{F}(\hat{x}_2; \theta)$$

wherein $F(\bullet; \theta)$ and $G(\bullet; \mu)$ are both convolutional neural networks, and $\theta$ and $\mu$ are respectively trainable tests for the two convolutional neural networks; and
feature decomposition, wherein $\hat{x}_1$ and $\hat{x}_2$ are merged to obtain an output signal.

9. The variable-bit-rate image compression method according to claim 1, wherein parameters of the first decomposition transform neural network, the first synthesis transform neural network and the entropy model are obtained by iterative learning based on a training image set, which comprises:
training image set obtaining: using the training image set as the to-be-encoded image;
forward mapping: performing forward mapping on the to-be-encoded image through the first decomposition transform neural network to obtain the initial feature map of the image;
quantization surrogation: quantizing the feature map by the dead-zone quantizer to obtain a noised feature map of the image, wherein for an element y on any position in the initial feature map, a quantization output thereof is expressed as:

$$\tilde{y} = \beta(y; q, z) + n$$

wherein n is random uniform noise within a value range of $[-\frac{1}{2}, \frac{1}{2}]$, and $\beta(y; q, z)$ meets:

$$B(y; q, z) = \begin{cases} \frac{y}{q} - \frac{z-1}{2}, & \text{for } y > \frac{qz}{2}, \\ \frac{y}{qz}, & \text{for } -\frac{qz}{2} \le y \le \frac{qz}{2}, \\ \frac{y}{q} + \frac{z-1}{2}, & \text{for } y < -\frac{qz}{2}. \end{cases}$$

wherein q is a quantization step size, and z is a dead-zone rate;

entropy estimation: inputting the noised feature map to the entropy model, and outputting Gaussian distribution of an element on each position of the noised feature map, wherein a symbolic probability of an element u on any position is expressed as:

$$p_{\tilde{y}}(\tilde{y}) = \int_{\tilde{y}-0.5}^{\tilde{y}+0.5} \frac{1}{\sigma\sqrt{2\pi}} e^{-\frac{1}{2}\left(\frac{\tilde{y}-\mu}{\sigma}\right)^2} d\tilde{y}$$

wherein μ and σ are respectively a mean value and a variance of estimated Gaussian distribution; in addition, any element in noised hyper-prior information in the entropy model is marked as $\tilde{z}$, and the symbolic probability obtained by structure distribution calculation is $p_{\tilde{z}}(\tilde{z})$; and empirical entropies of the noised feature map and the noised hyper-prior information are encoded as $L_R = -\Sigma_{\tilde{y}} \log_2(p_{\tilde{y}}(\tilde{y})) - \Sigma_{\tilde{z}} \log_2(p_{\tilde{z}}(\tilde{z}))$;

inverse quantization: performing inverse quantization on the noised feature map to obtain a reconstructed feature map of the image, wherein for an element $\hat{y}$ on any position in the noised feature map, an inverse quantization output thereof is expressed as:

$$B^{-1}(\hat{y}; q, z) = \begin{cases} q \cdot \hat{y} - \frac{q(1-z)}{2}, & \text{for } \hat{y} > \frac{1}{2}, \\ qz \cdot \hat{y}, & \text{for } -\frac{qz}{2} \le \hat{y} \le \frac{1}{2}, \\ q \cdot \hat{y} + \frac{q(1-z)}{2}, & \text{for } \hat{y} < -\frac{1}{2}. \end{cases}$$

herein q is a quantization step size, and z is a dead-zone rate;

inverse mapping: perform inverse mapping on the reconstructed feature map through the first synthesis transform neural network to obtain the reconstructed image;

distortion estimation: marking the to-be-encoded image as X, marking a size as H×W, marking the reconstructed image as $\bar{X}$, and marking reconstruction distortion as $$\mathcal{L}_D = \frac{1}{HW} \|X - \bar{X}\|_2^2;$$

and gradient update: by predetermining the dead-zone rate and giving N different quantization step sizes, obtaining N groups of empirical entropies and reconstruction distortion respectively marked as $L_R^{(1)}, L_R^{(2)}, \ldots, L_R^{(N)}$ and $L_D^{(1)}, L_D^{(2)}, \ldots, L_D^{(N)}$, and predetermining N Lagrangian multipliers $\lambda_1, \lambda_2, \ldots, \lambda_N$ therefor; and in a training process, randomly adopting a quantization step size every time to obtain a loss function $L_R^{(i)} + \lambda_i \cdot L_D^{(i)}$ adopted this time, and updating the parameters of the neural networks by backpropagation.

10. The variable-bit-rate image compression method according to claim 1, wherein the bit-rate control comprises:
bit-rate calculation: inputting a size H×W of the to-be-encoded image and a bit number: S of the compressed bit-stream, and calculating the bit-rate of the compressed bit-stream as $$r = \frac{S}{HW};$$

distortion calculation: marking the to-be-encoded image as X marking a size as H×W, marking the reconstructed image as $\tilde{X}$, and marking reconstruction distortion as $$\frac{1}{HW} \|X - \tilde{X}\|_2^2;$$

quantization step size-bit-rate modeling: performing quantization three times with different quantization step sizes, entropy encoding and bit-rate calculation on the initial feature map to obtain three groups of quantization step sizes and the bit-rate of the compressed bit-stream, and fitting a quantization step size-bit-rate model as:

$$\frac{1}{q} = \alpha R^2 \beta R + \gamma,$$

wherein q is the quantization step size, R is the bit-rate, and α, β and γ are three to-be-fitted parameters;

quantization step size-distortion modeling: performing repeated quantization with different quantization step sizes, inverse quantization, inverse mapping and distortion calculation on the initial feature map to obtain a plurality of groups of quantization step sizes and distortion of the reconstructed image, and fitting a quantization step size-distortion model as:

$$\frac{1}{q} = \frac{\zeta}{D} + \eta \log D + \iota,$$

wherein q is the quantization step size, D is the bit-rate, and ζ, η and L are three to-be-fitted parameters; and quantization step size decision making: giving a target bit-rate $\bar{R}$ or target distortion $\bar{D}$, and inferring the corresponding quantization step size $(\alpha \tilde{R}^2 + \beta \tilde{R} + \gamma)^{-1}$ or $$\left(\frac{\zeta}{D} + \eta \log \bar{D} + \iota\right)^{-1}$$

according to quantization step size-bit-rate model or the quantization step size-distortion model.

11. An image compression apparatus, configured for image compression by adopting the variable-bit-rate image compression method according to claim 1.

12. A terminal, comprising a memory, a processor and a computer program stored in the memory and capable of running on the processor, wherein the processor, when executing the program, is configured to perform the method according to claim 1.

13. A non-transitory computer-readable storage medium having a computer program stored thereon, wherein the program, when executed by a processor, is configured to performing the method according to claim 1.

14. A terminal, comprising a memory, a processor and a computer program stored in the memory and capable of running on the processor, wherein the processor, when executing the program, is configured to operate the image compression apparatus according to claim 11.

15. A non-transitory computer-readable storage medium having a computer program stored thereon, wherein the program, when executed by a processor, is configured to operate the image compression apparatus according to claim 11.

* * * * *